United States Patent [19]
Darnell

[11] Patent Number: 6,101,799
[45] Date of Patent: Aug. 15, 2000

[54] FOLDABLE RAKE IMPLEMENT

[76] Inventor: Clete Darnell, 5210 Kentucky Dam Rd., Paducah, Ky. 42003

[21] Appl. No.: 09/268,782

[22] Filed: Mar. 15, 1999

Related U.S. Application Data

[60] Provisional application No. 60/078,313, Mar. 17, 1998.

[51] Int. Cl.$^7$ .............................. A01D 7/00; A01D 7/06
[52] U.S. Cl. .................. 56/342; 56/400.01; 56/400.04; 56/400.19; 56/400.2
[58] Field of Search ................ 56/342, 400.01, 56/400.04, 400.19, 400.2; 15/116.1, 116.2, 119.1, 119.2; 294/19.1

[56] References Cited

U.S. PATENT DOCUMENTS

| | | | |
|---|---|---|---|
| 2,790,296 | 4/1957 | Bernstein | 56/400.04 |
| 2,840,978 | 7/1958 | Spinosa | 56/400.04 |
| 2,902,815 | 9/1959 | Gallo, Sr. | 56/400.04 |
| 5,414,982 | 5/1995 | Darnell | 56/400.19 |
| 5,440,868 | 8/1995 | Darnell | 56/400.17 |
| 5,618,075 | 4/1997 | Baziuk | 294/19.1 |
| 5,927,058 | 7/1999 | Hsu | 56/400.16 |
| 5,970,696 | 10/1999 | Van Benschoten, Jr. et al. | 56/400.18 |

*Primary Examiner*—Eileen Dunn Lillis
*Assistant Examiner*—Gary S. Hartmann
*Attorney, Agent, or Firm*—George H. Morgan

[57] ABSTRACT

An apparatus comprising a frame subassembly, an actuator, a cable, rollers and a flexible hinge. The rollers include two rollers located at the outer edges of, and perpendicular to, the frame subassembly and two rollers located in and parallel to the plane of the frame subassembly located adjacent to the flexible hinge which is located in the center of the frame subassembly. When the actuator is actuated, the frame subassembly folds about the flexible hinge.

2 Claims, 5 Drawing Sheets

FOLDABLE RAKE IMPLEMENT

CROSS REFERENCES TO RELATED APPLICATIONS

Provisional Application for Patent 60/078,313 of Mar. 17, 1998 for Foldable Rake Implement Improvements. Applicant claims priority pursuant to 35 U.S. C. Par. 119(e)(i).

STATEMENT AS TO RIGHTS TO INVENTIONS MADE UNDER FEDERALLY SPONSORED RESEARCH AND DEVELOPMENT

Not applicable

BACKGROUND OF THE INVENTION

1. Field of the Invention

This invention relates to an improved foldable rake implement. The invention includes improvements to the Foldable Rake Implement, U.S. Pat. No. 5,440,868. The improvements enhance the performance and producibility of the foldable rake implement of the above prior art patent.

2. Background Information

U.S. Pat. No. 5,440,868, Aug. 15, 1995, and U.S. Pat. No. 5,414,982 of May 16, 1995, both by Darnell, are foldable rake implements that perform their functions quite well. However, there is always a better way, as will be seen in the subsequent description of the preferred embodiments of the present invention.

FIGS. 1, 2, and 7 illustrate details of the prior art foldable rake implement as covered by U.S. Pat. No. 5,440,868, Aug. 15, 1995 by Darnell, who is the present inventor of the improvements that will be discussed in the subsequent description.

In FIGS. 1 and 2, two cables, 80 and 82 are shown connected to an actuator 75 of a foldable rake implement 10. The cables 80 and 82 travel through guide eyes and notches until they reach their repsective attachment points.

In FIG. 7, a prior art articulated frame structure 18 includes a first frame half 18A and a second frame half 18B. The frame half 18A contains hinge pin retaining devises 48, 52, and 56 which receive pins 46, 50, and 54 which are a part of the second frame half 18B.

SUMMARY OF THE INVENTION

The present invention is an improved foldable rake implement. The improvements relate to using a flexible plastic hinge between folding halves of the implement, so the folding halves can be made as one part, preferably as one injection molded part in combination with rollers that reduce the force required to actuate the implement for its intended purpose.

DESCRIPTION OF THE PREFERRED EMBODIMENTS

Figure 3:
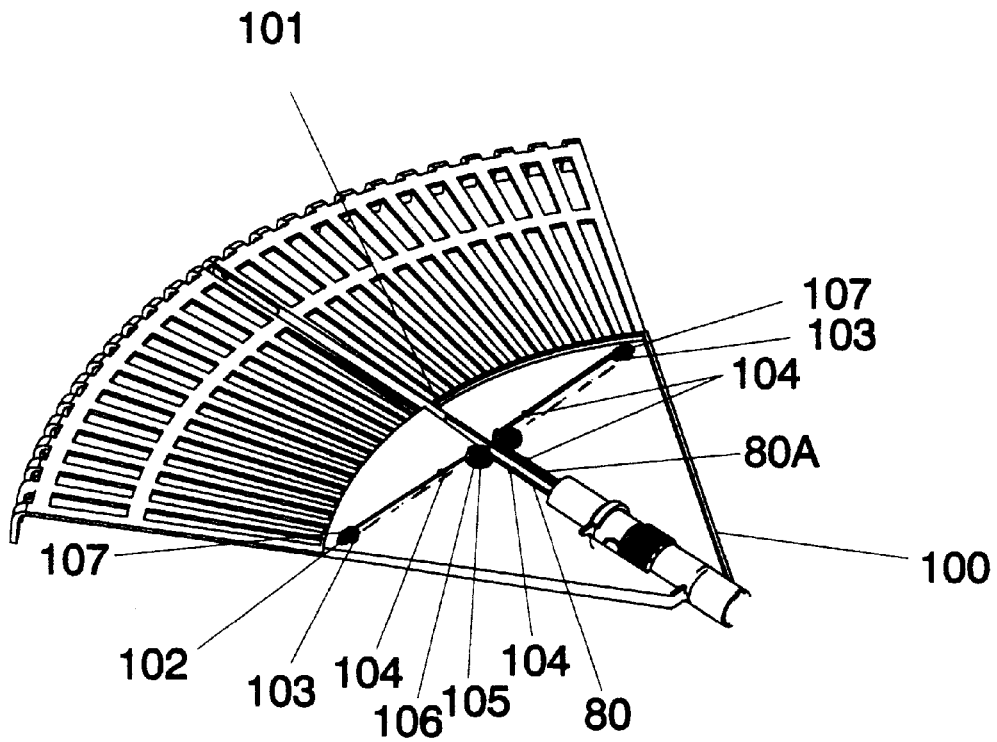
FIG. 3 is a view of the present invention.
Figure 4:
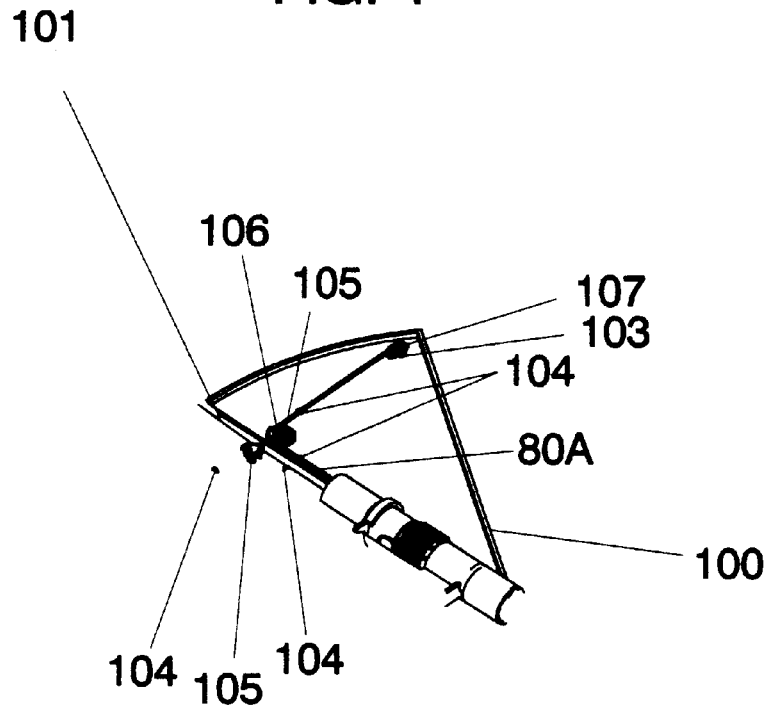
FIG. 4 is a closer view of the present invention.
Figure 5:
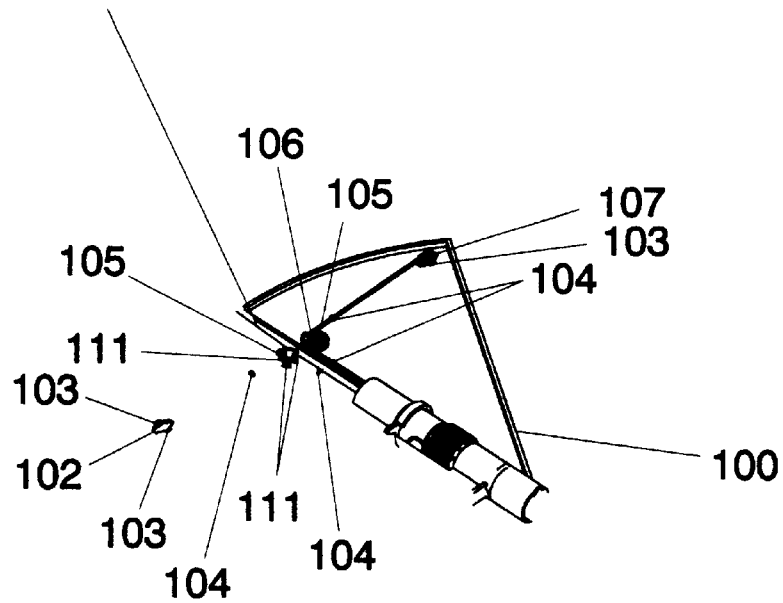
FIG. 5 is a view of some details of the present invention.
Figure 6:
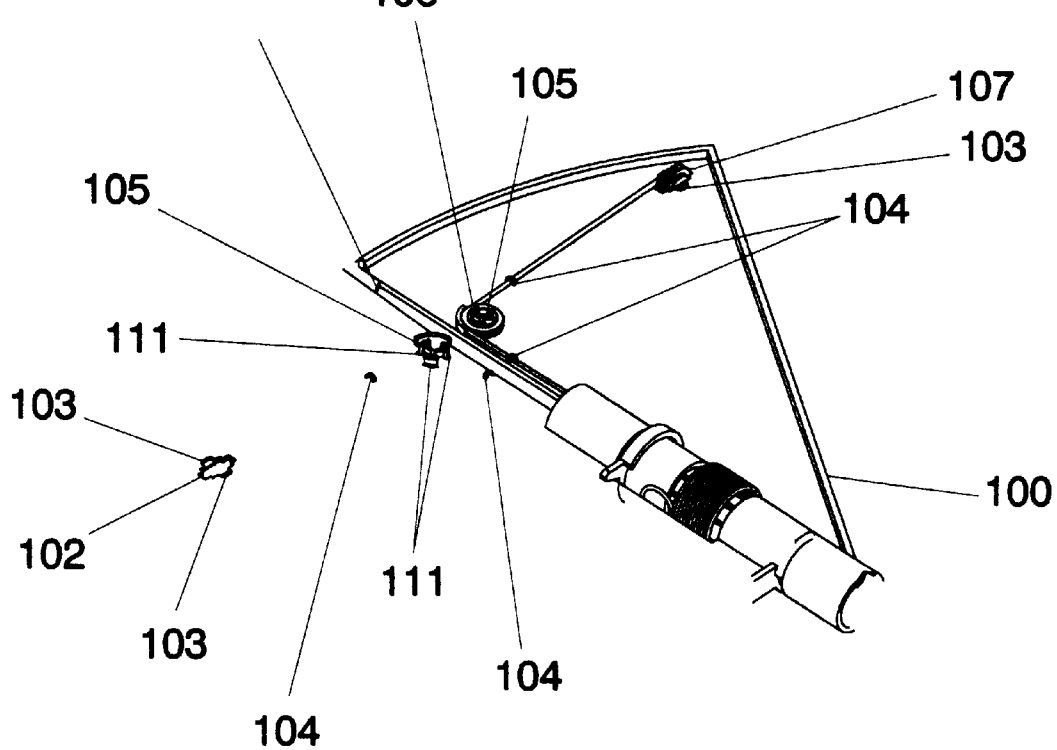
FIG. 6 is another view of details of the present invention.
Figure 7:
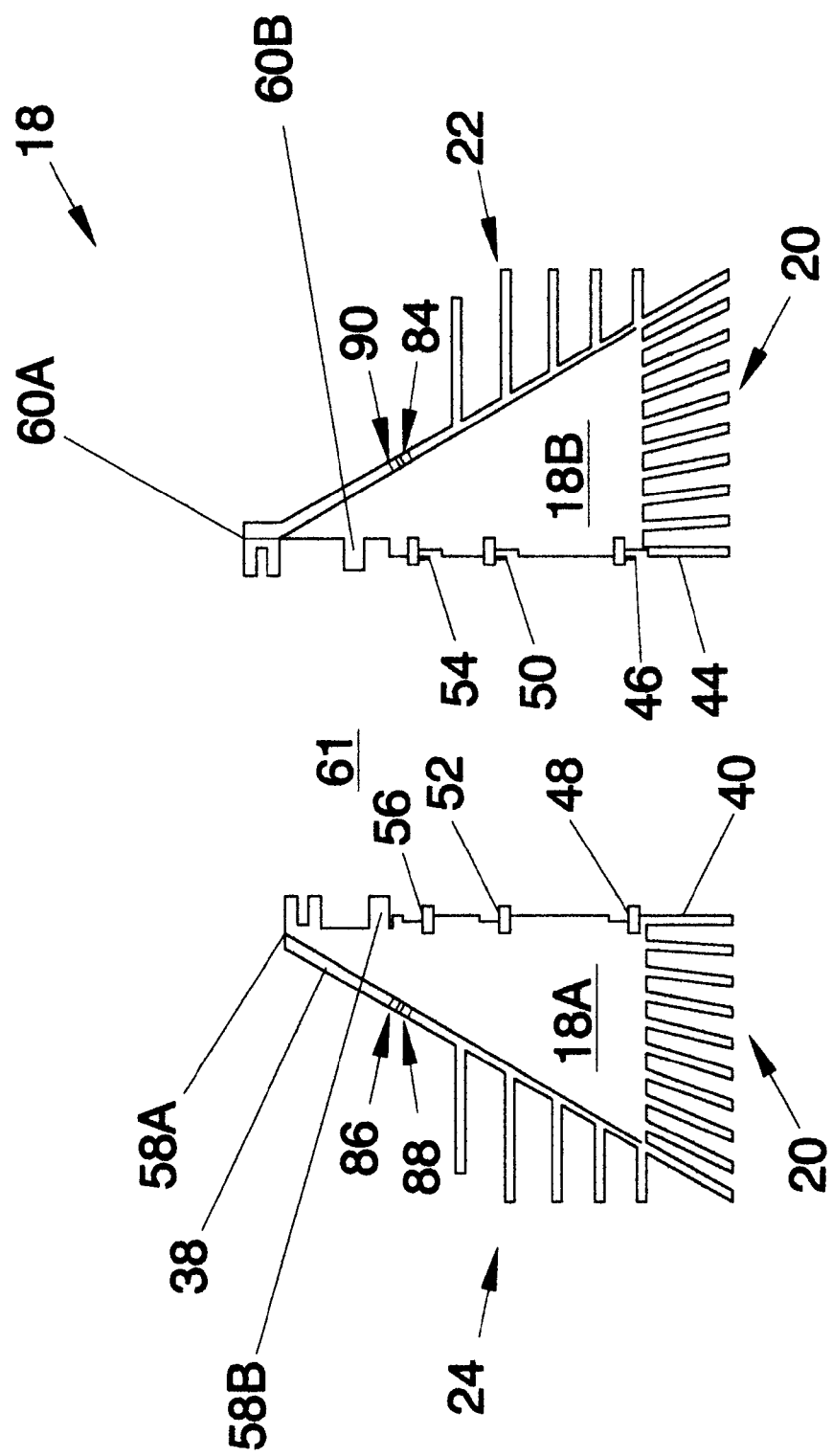
FIG. 7 is a view of prior art details.

The frame subassembly 100, as shown in FIGS. 3, 4, and 5, includes a prior art flexible plastic hinge 101 which is centered in said frame subassembly 100 and permits the frame subassembly 100 to be manufactured of plastic, preferrably by injection molding, as one piece. The plastic hinge 101 permits the frame subassembly 100 to fold about said plastic hinge 101. The foldable subassembly 100 facilitates picking up leaves.

As shown in FIGS. 3, 4, and 5, the subassembly 100 further includes clearances 102, depressions 103, eyelets 104, roller mounts 105 inserted through mount clearances 111, rollers 106 mounted on roller mounts 105, and vertical rollers 107 inserted into and secured in the clearances 102 and depressions 103. By the term "vertical rollers" is meant "rollers perpendicular to the subassembly 100 surface plane". The vertical rollers 107, each of which are located adjacent to an outer edge of the subassembly 100, roll while the rollers 106 provide a bearing surface for the cable 80A but do not need to roll to provide the intended function. The rollers 106 are secured in, and parallel to, the plane surface of the subassembly 100 adjacent to the hinge 101, by means of the roller mounts 105 secured in the subassembly 100. Acetel plastic is the preferred material of construction for rollers 106 and the vertical rollers 107. As obvious to anyone skilled in the art, the roller mounts 105 can be integrally molded as a part of the subassembly 100.

Figure 1:
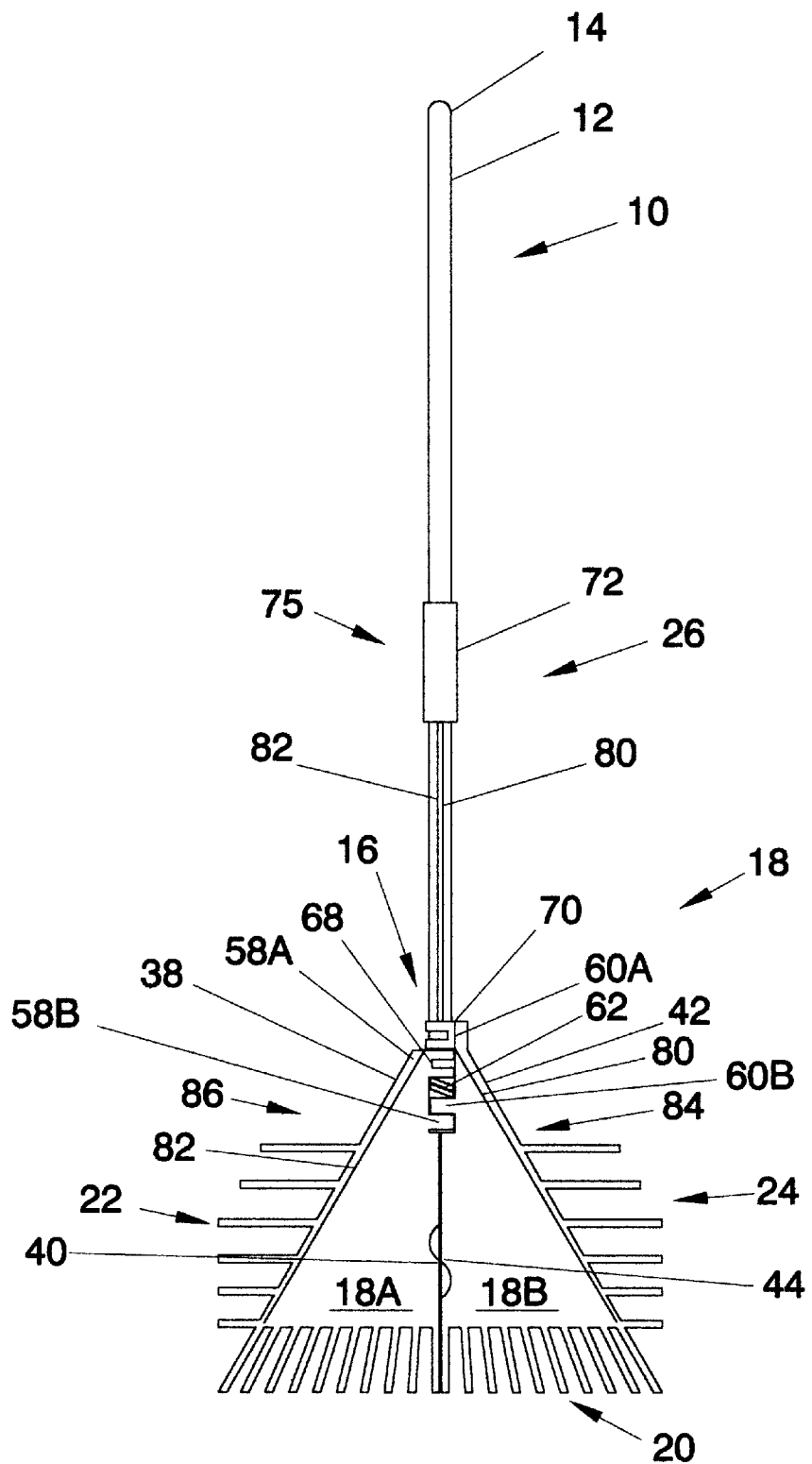
FIG. 1 is a view of a prior art foldable rake implement.
Figure 2:
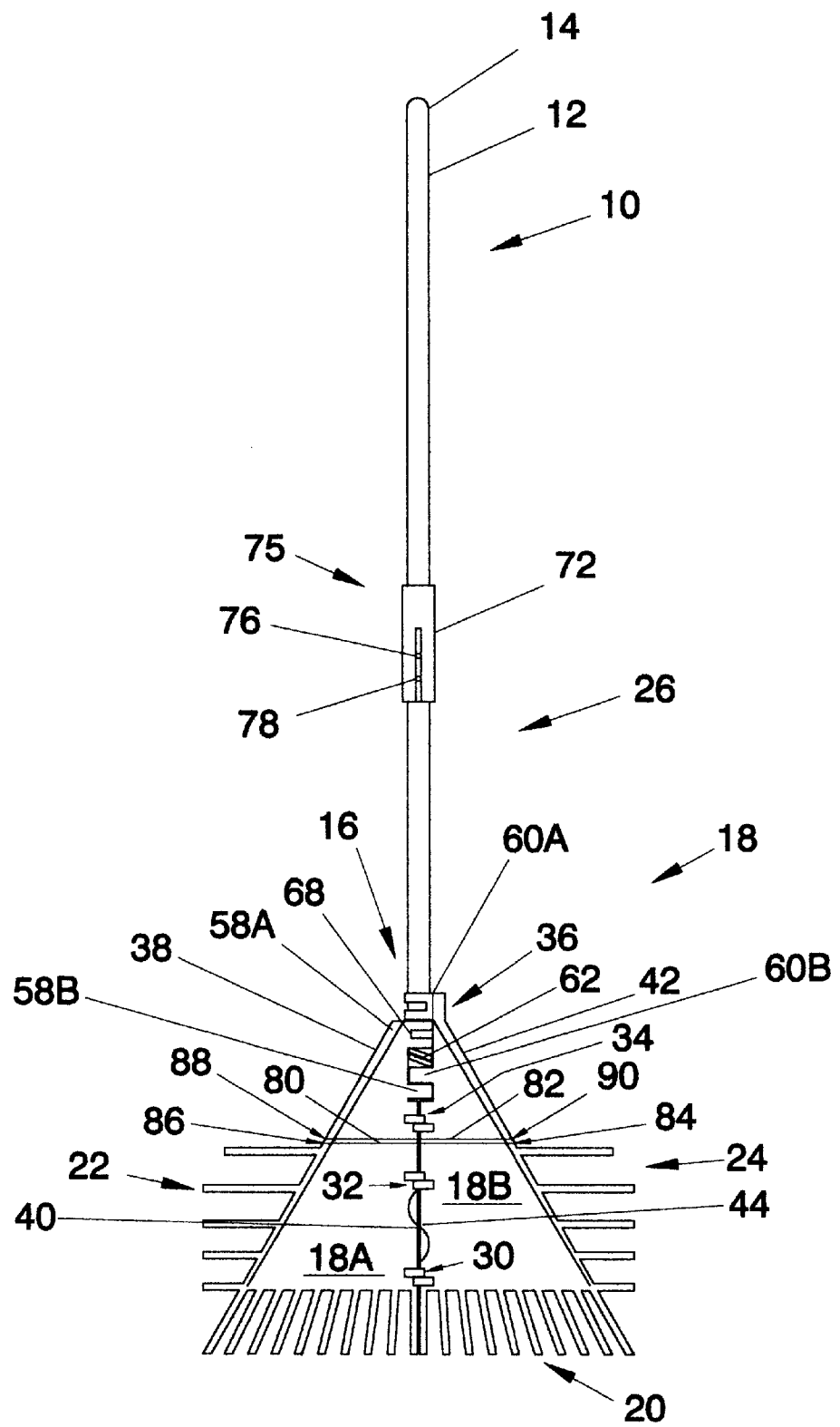
FIG. 2 is a view of the reverse side of the prior art foldable rake implement shown in FIG. 1.

As indicated in FIG. 3, a difference in the prior art is that cable 80A, which is attached to a prior art actuator 75 (Ref. FIGS. 1 and 2) travels through an eyelet 104 around a rollere 106 through another eyelet 104, around a vertical roller 107 through a clearance 102 (Ref. FIG. 5), and then across the back side of the subassembly 100 as indicated by a broken line to another clearance 102, which will contain a vertical roller 107, then around a second vertical roller 107 which will be inserted into and secured in the clearance 102 and the depression 103 shown in FIG. 3, then back through another eyelet 104, around a roller 106 that will be mounted on the roller mount 105 then through the eyelet indicated as cable 80A returns to the prior art actuator 75. Instead of two cables, 80 and 82 as in the prior art, there is now only one cable, cable 80A. It is a steel cable in the preferred embodiment of the present invention. The single cable 80A combined with the rollers 106 and the vertical rollers 107 results in less effort to actuate the improved foldable rake implement as compared to the prior art foldable rake implement 10 shown in FIGS. 1 and 2. The second vertical roller 107 was not shown in FIG. 3 for ease of illustration of the clearance 102 and the depression 103 which is shown in FIG. 3.

This disclosure details the differences of the present invention from the prior art foldable rake implement 10 as detailed in the previously mentioned U.S. Pat. No. 5,440, 868. These differences enhance the performance and producibility of the improved foldable rake implement as shown in FIGS. 3, 4, and 5.

Although the description above contains many specificities, these should not be construed as limiting the scope of the invention but as merely providing illustrations of some of the presently preferred embodiments of this invention.

Thus the scope of the invention should be determined by the appended claims in the formal application and their legal equivalents, rather than by the examples given.

What is claimed is:

1. A foldable rake comprising:
   a) a frame subassembly, a flexible hinge centered in the frame subassembly, an actuator, a cable having two ends, a first plurality of rollers having peripheries, and a second plurality of rollers having peripheries;

wherein the first plurality of rollers are attached to the frame subassembly and include a roller mounted in a plane substantially parallel to the frame subassembly, and a roller mounted in a plane substantially perpendicular to the frame subassembly;

wherein the second plurality of rollers are attached to the frame subassembly and include a roller mounted in a plane substantially parallel to the frame subassembly, and a roller mounted in a plane substantially perpendicular to the frame subassembly;

wherein the cable extends around the peripheries of the first plurality of rollers and around the peripheries of the second plurality of rollers, and is connected at both ends to the actuator;

wherein actuation of the actuator moves the cable across the roller peripheries and causes the frame subassembly to fold about the flexible hinge.

2. The foldable rake according to claim 1 and further comprising eyelets mounted to the frame subassembly, through which the cable is guided.

* * * * *